(12) United States Patent
Karczewicz et al.

(10) Patent No.: US 11,451,773 B2
(45) Date of Patent: Sep. 20, 2022

(54) BLOCK-BASED ADAPTIVE LOOP FILTER (ALF) DESIGN AND SIGNALING

(71) Applicant: QUALCOMM Incorporated, San Diego, CA (US)

(72) Inventors: Marta Karczewicz, San Diego, CA (US); Akshay Gadde, Fremont, CA (US); Vadim Seregin, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/427,017

(22) Filed: May 30, 2019

(65) Prior Publication Data

US 2019/0373258 A1 Dec. 5, 2019

Related U.S. Application Data

(60) Provisional application No. 62/679,685, filed on Jun. 1, 2018.

(51) Int. Cl.
*H04N 19/117* (2014.01)
*H04N 19/96* (2014.01)
*H04N 19/70* (2014.01)
*H04N 19/176* (2014.01)

(52) U.S. Cl.
CPC ......... *H04N 19/117* (2014.11); *H04N 19/176* (2014.11); *H04N 19/70* (2014.11); *H04N 19/96* (2014.11)

(58) Field of Classification Search
None
See application file for complete search history.

(56) References Cited

U.S. PATENT DOCUMENTS

| 8,811,484 | B2 | 8/2014 | Motta et al. |
| 9,357,235 | B2 | 5/2016 | Chong et al. |
| 9,596,463 | B2 * | 3/2017 | Chong ................. H04N 19/463 |
| 9,813,738 | B2 | 11/2017 | Tsai et al. |
| 9,819,966 | B2 | 11/2017 | Chong et al. |

(Continued)

FOREIGN PATENT DOCUMENTS

| WO | 2010005808 | 1/2010 |
| WO | 2013055923 A1 | 4/2013 |
| WO | 2018122092 A1 | 7/2018 |

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

(Continued)

*Primary Examiner* — Chikaodili E Anyikire
(74) *Attorney, Agent, or Firm* — Shumaker & Sieffert, P.A.

(57) ABSTRACT

A video encoder and video decoder may determine a set of adaptive loop filters, from among a plurality of sets of adaptive loop filters, on a per-block basis. Each set of adaptive loop filters may include filters from a previous picture, filters signaled for the current picture, and/or pre-trained filter. By varying the set of adaptive loop filters on a per-block basis, the adaptive loop filters available for each block of video data may be more adapted to local statistics of the video data.

36 Claims, 8 Drawing Sheets

(56) References Cited

U.S. PATENT DOCUMENTS

| | | | |
|---|---|---|---|
| 9,872,015 B2* | 1/2018 | Fu | H04N 19/117 |
| 9,877,023 B2 | 1/2018 | Chong et al. | |
| 10,057,574 B2 | 8/2018 | Li et al. | |
| 2010/0074330 A1* | 3/2010 | Fu | H04N 19/142 |
| | | | 375/240.12 |
| 2011/0274158 A1* | 11/2011 | Fu | H04N 19/439 |
| | | | 375/240.02 |
| 2012/0039383 A1* | 2/2012 | Huang | H04N 19/176 |
| | | | 375/240.02 |
| 2012/0082241 A1* | 4/2012 | Tsai | H04N 19/117 |
| | | | 375/240.25 |
| 2012/0170645 A1 | 7/2012 | Chien et al. | |
| 2012/0177104 A1* | 7/2012 | Budagavi | H04N 19/176 |
| | | | 375/240.02 |
| 2012/0269264 A1* | 10/2012 | Sato | H04N 19/134 |
| | | | 375/240.03 |
| 2012/0294353 A1 | 11/2012 | Fu et al. | |
| 2013/0022104 A1* | 1/2013 | Chen | H04N 19/61 |
| | | | 375/240.02 |
| 2013/0114694 A1* | 5/2013 | Chen | H04N 19/70 |
| | | | 375/240.03 |
| 2013/0194384 A1* | 8/2013 | Hannuksela | H04N 19/50 |
| | | | 348/43 |
| 2013/0243104 A1* | 9/2013 | Chen | H04N 19/51 |
| | | | 375/240.29 |
| 2014/0355695 A1* | 12/2014 | Lim | H04N 19/61 |
| | | | 375/240.29 |
| 2016/0234492 A1* | 8/2016 | Li | H04N 19/82 |
| 2018/0192050 A1 | 7/2018 | Zhang et al. | |
| 2019/0166370 A1 | 5/2019 | Xiu et al. | |
| 2020/0084444 A1 | 3/2020 | Egilmez et al. | |
| 2020/0236371 A1* | 7/2020 | Nishi | H04N 19/117 |

OTHER PUBLICATIONS

Bross B., et al., "High Efficiency Video Coding (HEVC) Text Specification Draft 10 (for FDIS & Last Call)," Joint Collaborative Team on Video Coding (JCT-VC) of Itu-T SG 16 WP 3 and ISO/IEC JTC 1/SC 29/WG 11, 12th Meeting: Geneva, CH, Jan. 14-23, 2013, JCTVC-L1003-v34, 263 pp.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.

Chen J., et al., "Algorithm Description for Versatile Video Coding and Test Model 5 (VTM 5)", 14th JVET Meeting; Mar. 19, 2019-Mar. 27, 2019; Geneva; (The Joint Video Exploration Team of ISO/IEC JTC1/SC29/WG11 and ITU-T SG.16), No. JVET-N1002, May 21, 2019, XP030205194, Retrieved from the Internet: URL:http://phenix.int-evry.fr/jvet/doc_end_user/documents/14_Geneva/wg11/JVET-N1002-v1.zip JVET-N1002-v1.docx, 70 pages.

Chen J., et al., "Algorithm Description of Joint Exploration Test Model 1", Joint Video Exploration Team (JVET) of ITU-T SG 16 WP 3 and ISO/IEC JTC 1/SC 29/WG 11,1nd Meeting: Geneva, CH, Oct. 19-21, 2015, 27 Pages, JVET-A001.

Chen J., et al., JVET-G1001-V1 "Algorithm Description of Joint Exploration Test Model 7 (JEM7)", Joint Video Exploration Team (JVET)OF ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, p. i-iv, Retrieved from the Internet: URL: http://phenix.int-evry.fr/jvet/doc_end_user/documents/7_Torino/wg11/JVET -G0001-v1.zip, p. 20, Paragraph 2.3.7—p. 23, Paragraph 2.3.7 6, p. 17, Paragraph 2.3.5—p. 18, section 2.

De La Rocha Gomes-Arevalillo A., "Investigating the Adaptive Loop Filter in Next Generation Video Coding", Independent thesis Advanced level (degree of Master (Two Years)), Feb. 8, 2017 (Feb. 8, 2017), XP055509944, 75 pages. Retrieved from the Internet:URL: http://www.diva-portal.orgjsmashjget/diva2:1072638/FULLTEXT01.pdf [retrieved on Sep. 26, 2018].

Fu C-M., et al., "Sample Adaptive Offset in the HEVC Standard", IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.

Hu N., et al., "CE5: Coding Tree Block based Adaptive Loop Filter (CE5-4)", Joint Video Experts Team (JVET) of ITU-T SG 16 WP 3 and ISO/IEC JTC 1/SC 29/WG 11, JVET-N0415-v2, 14th Meeting: Geneva, CH, Mar. 19-27, 2019, 16 pages.

International Search Report and Written Opinion—PCT/US2019/034964—ISA/EPO—dated Jul. 31, 2019.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.265, "Series H: Audiovisual and Multimedia Systems, Infrastructure of audiovisual services—Coding of moving video, High efficiency video coding," The International Telecommunication Union. Dec. 2016, 664 pp.

Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-C0038, 3rd Meeting: Geneva, CH, , May 26-Jun. 1, 2016, 4 pages.

Karczewicz M., et al., "Geometry Transformation-based Adaptive In-Loop Filter," Picture Coding Symposium, IEEE, Dec. 4-7, 2016, pp. 1-5, XP033086856, DOI: 10: 1109/PCS.2016.7906346, [retrieved on Apr. 19, 2017].

Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://PHENIX.INT-EVRY.FR/JVET/., No. JVET-B0060, 6 pages.

Norkin A., et al., "HEVC Deblocking Filter", IEEE Transactions on Circuits and Systems for Video Technology, Dec. 1, 2012 (Dec. 1, 2012), vol. 22, No. 12, pp. 1746-1754, XP011487156.

Tsai C-Y., et al., "Adaptive Loop Filtering for Video Coding," IEEE Journal of Selected Topics in Signal Processing, vol. 7 (6), Dec. 1, 2013, pp. 934-945, XP055265962, US ISSN: 1932-4553, DOI: 10.1109/JSTSP.2013.2271974, the whole document.

Wang Y-K., et al., "High Efficiency Video Coding (HEVC) Defect Report," Joint Collaborative Team on Video Coding (JCT- VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.

U.S. Appl. No. 16/567,966, filed Sep. 11, 2019, by Hilmi Enes Egilmez et al.

Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v2, 43 pages.

Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.

Bross B., et al., "Versatile Video Coding (Draft 7)", Joint Video Experts Team (JVET) of ITU-T SG 16 WP 3 and ISO/IEC JTC 1/SC 29/WG 11, 16th Meeting, Oct. 1-11, 2019, JVET-P2001-v9, 490 pages.

U.S. Appl. No. 16/717,530, filed Dec. 17, 2019, by Nan Hu et al.

Hu N., et al., "Coding tree block based adaptive loop filter", Joint Video Experts Team (JVET) of ITU-T SG 16 WP 3 and ISO/IEC JTC 1/SC 29/WG 11, JVET-M0429, 13th Meeting: Marrakech, MA, Jan. 9-18, 2019, pp. 1-12.

Bross B., et al., "Versatile Video Coding (Draft 7)", Joint Video Experts Team (JVET) of ITU-T SG 16 WP 3 and ISO/IEC JTC 1/SC 29/WG 11, JVET-P2001-vE, 16th Meeting: Geneva, CH, Oct. 1-11, 2019, 488 pages.

Chen J., et al., "Algorithm Description of Joint Exploration Test Model 1," 1, JVET Meeting, Oct. 19-21, 2015, Geneva, CH (The Joint Video Exploration Team of ISO/IEC JTC1/SC29/WG11 and ITU-T SG.16); URL: http://phenix.int-evry.fr/jvet/, No. JVET-A1001, Feb. 24, 2016 (Feb. 24, 2016), XP030150000, 27 pages.

(56) References Cited

OTHER PUBLICATIONS

Chen J., et al., "Coding Tools Investigation for Next Generation Video Coding", ITU-T SG 16, Contribution 806, COM16-C806-E, Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].

Co-Pending U.S. Appl. No. 16/717,530, filed Dec. 17, 2019.

Ergen S., "ZigBee/IEEE 802.15.4 Summary", Sep. 10, 2004, 37 Pages.

Hu N., et al., "CE5: Coding Tree Block based Adaptive Loop Filter (CE5-4)", Joint Video Experts Team (JVET) of ITU-T SG 16 WP 3 and ISO/IEC JTC 1/SC 29/WG 11, JVET-N0415, 14th Meeting: Geneva, CH, Mar. 19-27, 2019, pp. 1-6.

Hu (QUALCOMM) N, et al., "CE2.3 and CE2.4: Fixed Filters, Temporal Filters, CU-Level Control and Low-Latency Encoder for ALF", 12.JVET Meeting, Oct. 3, 2018-Oct. 12, 2018, Macao, CN (The Joint Video Exploration Team of ISO/IEC JTC1/SC29/WG11 and ITU-T SG. 16), No. JVET-L0391, Oct. 1, 2018 (Oct. 1, 2018), 37 Pages, XP030194208, Retrieved from the Internet: URL: http://phenix.int-evry.fr/jvet/doc_end_user/documents/12_Macao/wg11/JVET-L0391-v2.zip JVET-L0391-v2.docx [retrieved on Oct. 1, 2018] section 2.1.2.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Wang Y-K et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2 6 on p. 125, section 8.5.3.2.7 on pp. 126-129, and section 8.5.3.2.8 on pp. 129 and 130.

Wiegand T., et al., "WD3: Working Draft 3 of High-Efficiency Video Coding," Document JCTVC-E603, 5th Meeting: Geneva, CH, Mar. 16-23, 2011, 293 pages.

Zhang, et al., "ALF Temporal Prediction with Temporal Scalability," Joint Video Exploration Team {JVET) of ITU-T SG 16 WP 3 and ISO/IEC JTC 1/SC 29/WG 11, Document No. JVET-E0104, 5th Meeting; Geneva, CH, Jan. 12-20, 2017, last updated Jan. 14, 2017, 4 Pages.

Chen H., et al., "Description of SDR, HDR and 360° Video Coding Technology Proposal by Huawei, GoPro, HiSilicon, and Samsung", 10th JVET Meeting, Apr. 10, 2018-Apr. 20, 2018, San Diego (The Joint Video Exploration Team of ISO/IEC JTC1/SC29/WG11 and ITU-T SG. 16 WP 3), No. JVET-J0025-v2, Apr. 14, 2018 (Apr. 14, 2018), XP030151192, 132 Pages, URL:http://phenix.int-evry.fr/jvet/.

Chen J., et al., "Coding Tools Investigation for Next Generation Video Coding based on HEVC", [Proceedings of SPIE, ISSN 0277-786X], SPIE, Bellingham, Wash, vol. 9599, Sep. 22, 2015, p. 95991B-1-95991B-9, XP060060836, DOI: 10.1117/12.2193681, ISBN: 978-1-62841-730-2.

Hsu C-W., et al., "Description of SDR Video Coding Technology Proposal by MediaTek",10th JVET Meeting, Apr. 10, 2018-Apr. 20, 2018, San Diego, (The Joint Video Exploration Team of ISO/IEC JTC1/SC 29/WG11 and ITU-TSG.16 WP 3), URL: http://phenix.int-evry.fr/jvet/, No. JVET-J0018, Apr. 3, 2018 (Apr. 3, 2018), XP030151179, 64 Pages.

Sjoberg R., et al., "JEM Bug Fixfor ALF Cross-Picture Prediction", 5th JVET Meeting, The Joint Video Exploration Team of ISO/IEC JTC 1/SC 29/WG11 and ITU-T SG 16 WP 3, Geneva, CH, Jan. 12, 2017-Jan. 20, 2017, No. JVET-E0030, Jan. 2, 2017 (Jan. 2, 2017), XP030150494, 5 pages, URL: http://phenix.int-evry.fr/JVET/.

* cited by examiner

BLOCK-BASED ADAPTIVE LOOP FILTER (ALF) DESIGN AND SIGNALING

This application claims the benefit of U.S. Provisional Application No. 62/679,685, filed Jun. 1, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to filtering techniques referred to as "Adaptive Loop Filter (ALF)." An ALF may be used in a post-processing stage, for in-loop coding, or in a prediction process. Sample adaptive offset (SAO) filtering and/or adaptive loop filtering may be applied to any of various existing video codec technologies, such as HEVC-compliant codec technology, or be an efficient coding tool in any future video coding standards. The techniques described may therefore apply to a variety of block-based video coding techniques in which video is reconstructed on a block-by-block basis. The blocks of pixels may variously be referred to as coding tree units (CTUs), largest coding units (LCU), prediction unit (PU) or other terminology depending upon the block-based video coding used, as described later.

As will be explained in more detail below, in accordance with the techniques of this disclosure, a video encoder and a video decoder may be configured to determine sets of adaptive loop filters, from among a plurality of sets of adaptive loop filters, on a per-block basis (e.g., for blocks for which adaptive loop filtering is enabled). In this way, the set of adaptive loop filters available for use with a particular block may be more adapted to the local characteristics of the video data near the particular block, thus improving coding efficiency and/or picture quality.

In one example, a method includes determining a respective set of adaptive loop filters, from among a plurality of sets of adaptive loop filters, per block of a current picture for blocks in which adaptive loop filtering is used, wherein each respective set of adaptive loop filters includes a previous adaptive loop filter used in one or more previous pictures, and adaptive loop filtering the blocks of the current picture in accordance with the respective sets of adaptive loop filters.

In another example, an apparatus configured to code video data includes a memory configured to store a current picture of video data, and one or more processors in communication with the memory, the one or more processors configured to determine a respective set of adaptive loop filters, from among a plurality of sets of adaptive loop filters, per block of the current picture for blocks in which adaptive loop filtering is used, wherein each respective set of adaptive loop filters includes a previous adaptive loop filter used in one or more previous pictures (or previous pictures, slices or other granularity of blocks), and adaptive loop filter the blocks of the current picture in accordance with the respective sets of adaptive loop filters.

In another example, an apparatus configured to code video data includes means for determining a respective set of adaptive loop filters, from among a plurality of sets of adaptive loop filters, per block of a current picture for blocks in which adaptive loop filtering is used, wherein each respective set of adaptive loop filters includes a previous adaptive loop filter used in one or more previous pictures, and means for adaptive loop filtering the blocks of the current picture in accordance with the respective sets of adaptive loop filters.

In another example, this disclosure describes a non-transitory computer-readable storage medium storing instructions that, when executed, cause one or more processors to determine a respective set of adaptive loop filters, from among a plurality of sets of adaptive loop filters, per block of the current picture for blocks in which adaptive loop filtering is used, wherein each respective set of adaptive loop filters includes a previous adaptive loop filter used in one or more previous pictures, and adaptive loop filter the blocks of the current picture in accordance with the respective sets of adaptive loop filters.

The details of one or more examples are set forth in the accompanying drawings and the description below. Other features, objects, and advantages will be apparent from the description, drawings, and claims.

BRIEF DESCRIPTION OF DRAWINGS

FIGS. 3A-3D show four 1-D directional patterns for edge offset (EO) sample classification.

DETAILED DESCRIPTION

Figure 1:
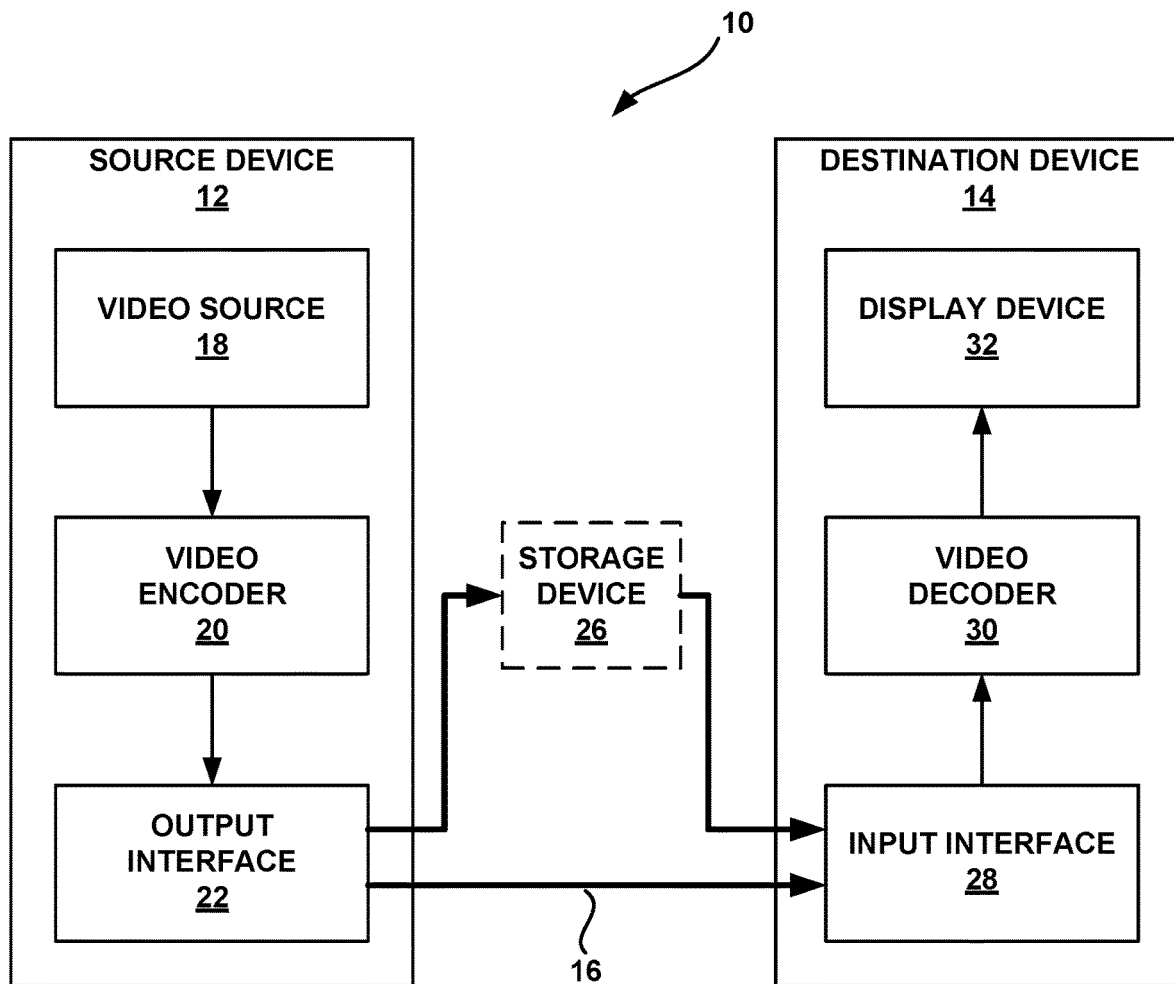
FIG. 1 is a block diagram illustrating an example video encoding and decoding system that may utilize the techniques described in this disclosure.

FIG. 1 is a block diagram illustrating an example video encoding and decoding system 10 that may utilize the techniques for adaptive loop filtering described in this disclosure. As shown in FIG. 1, system 10 includes a source device 12 that generates encoded video data to be decoded at a later time by a destination device 14. Source device 12 and destination device 14 may be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may be any type of medium or device capable of moving the encoded video data from source device 12 to destination device 14. In one example, link 16 may be a communication medium to enable source device 12 to transmit encoded video data directly to destination device 14 in real-time. The encoded video data may be modulated according to a communication standard, such as a wireless communication protocol, and transmitted to destination device 14. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded video data may be output from output interface 22 to a storage device 26. Similarly, encoded video data may be accessed from storage device 26 by input interface 28. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless connection (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, a video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. In general, capturing video data may include any technique for recording, generating, and/or sensing video data. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may be any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard, and may conform to the HEVC Test Model (HM). Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). Alternatively, video encoder 20 and video decoder 30 may operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual. HEVC (ITU-T H.265), including its range extension, multiview extension (MV-HEVC) and scalable extension (SHVC), were developed by the Joint Collaboration Team on Video Coding (JCT-VC) as well as the Joint Collaboration Team on 3D Video Coding Extension Development (JCT-3V) of ITU-T Video Coding Experts Group (VCEG) and ISO/IEC Motion Picture Experts Group (MPEG). The finalized HEVC draft, referred to as HEVC WD hereinafter, is available at http://phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now developing future video coding technology with a compression capability that potentially exceeds that of the current HEVC standard (including its current extensions and near-term extensions for screen content coding and high-dynamic-range coding). The new standard is called H.266/VVC (Versatile Video coding). The groups are working together on this exploration activity in a joint collaboration effort known as the Joint Video Exploration Team (JVET) to evaluate compression technology designs proposed by their experts in this area. The JVET first met during 19-21 Oct. 2015. One version of the reference software, i.e., Joint Exploration Model 7 (JEM7) can be downloaded from: https://jvet.hhi.fraunhofer.de/svn/svn_HMJEMSoftware/tags/HM-16.6-JEM-7.0/. The algorithm description for JEM7 is described in J. Chen, E. Alshina, G. J. Sullivan, J. R. Ohm, J. Boyce, "Algorithm description of Joint Exploration Test Model 7 (JEM7)," JVET-G1001, Torino, July 2017. A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v3 (hereinafter "VVC Draft 5"). The techniques of this disclosure, however, are not limited to any particular coding standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure describes techniques related to filtering operations which could be used in a post-processing stage, as part of in-loop coding, or in the prediction stage of video coding. The techniques of this disclosure may be implemented into existing video codecs, such as HEVC, or be an efficient coding tool for a future video coding standard, such as the H.266/VVC standard presently under development.

Video coding typically involves predicting a block of video data from either an already coded block of video data in the same picture (e.g., intra prediction) or an already coded block of video data in a different picture (e.g., inter prediction). In some instances, the video encoder 20 also calculates residual data by comparing the predictive block to the original block. Thus, the residual data represents a difference between the predictive block and the original block.

Video encoder 20 transforms and quantizes the residual data and signals the transformed and quantized residual data in the encoded bitstream. Video decoder 30 adds the residual data to the predictive block to produce a reconstructed video block that matches the original video block more closely than the predictive block alone. To further improve the quality of decoded video, video encoder 20 and video decoder 30 can perform one or more filtering operations on the reconstructed video blocks. Examples of these filtering operations include deblocking filtering, sample adaptive offset (SAO) filtering, and adaptive loop filtering. Parameters for these filtering operations may be determined by video encoder 20 and explicitly signaled in the encoded video bitstream or may be implicitly determined by video decoder 30 without needing the parameters to be explicitly signaled in the encoded video bitstream.

This disclosure describes techniques related to filtering method(s) referred to as "Adaptive Loop Filter (ALF)." An ALF may be used in a post-processing stage, for in-loop coding, or in a prediction process. SAO filtering and/or adaptive loop filtering may be applied to any of various existing video codec technologies, such as HEVC-compliant codec technology, or be an efficient coding tool in any future video coding standards.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, video encoder 20 typically performs video decoding as part of the processes of determining how to encode video data.

As will be explained in more detail below, in accordance with the techniques of this disclosure video encoder 20 and video decoder 30 may be configured to determine sets of adaptive loop filters, from among a plurality of sets of adaptive loop filters, on a per-block basis (e.g., for blocks for which adaptive loop filtering is enabled). In this way, the set of adaptive loop filters available for use with a particular block may be more adapted to the local characteristics of the video data near the particular block, thus improving coding efficiency and/or picture quality.

In HEVC, VVC, and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may include a coding tree block of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

In one example, to generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. Video encoder 20 may generate predictive luma, Cb, and Cr blocks for luma, Cb, and Cr prediction blocks of each PU of the CU.

As another example, video encoder 20 and video decoder 30 may be configured to operate according to JEM or VVC. According to JEM or VVC, a video coder (such as video encoder 20) partitions a picture into a plurality of coding tree units (CTUs). Video encoder 20 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs (transform units) of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 20 and video decoder 30 may use a single QTBT or MTT structure to represent each of the luminance and chrominance components, while in other examples, video encoder 20 and video decoder 30 may use two or more QTBT or MTT structures, such as one QTBT/MTT structure for the luminance component and another QTBT/MTT structure for both chrominance components (or two QTBT/MTT structures for respective chrominance components).

Video encoder 20 and video decoder 30 may be configured to use quadtree partitioning, QTBT partitioning, MTT partitioning, or other partitioning structures.

Video encoder 20 may use intra prediction or inter prediction to generate the predictive blocks for a block (e.g., a PU). If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

Some examples of JEM and VVC also provide an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

To perform intra-prediction, video encoder 20 may select an intra-prediction mode to generate the prediction block. Some examples of JEM and VVC provide sixty-seven intra-prediction modes, including various directional modes, as well as planar mode and DC mode. In general, video encoder 20 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 20 codes CTUs and CUs in raster scan order (left to right, top to bottom).

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

In some examples, video encoder 20 may use quad-tree partitioning to decompose the luma, Cb, and Cr residual blocks of a CU into one or more luma, Cb, and Cr transform blocks. In other examples, the transform block is the same size as the prediction block. A transform block is a rectangular (e.g., square or non-square) block of samples on which the same transform is applied. A transform unit (TU) of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

The above block structure with CTUs, CUs, PUs, and TUs generally describes the block structure used in HEVC. Other video coding standards, however, may use different block structures. As one example, although HEVC allows PUs and TUs to have different sizes or shapes, other video coding standards may require predictive blocks and transform blocks to have a same size. The techniques of this disclosure are not limited to the block structure of HEVC and may be compatible with other block structures.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may include a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI) messages, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Figure 2:
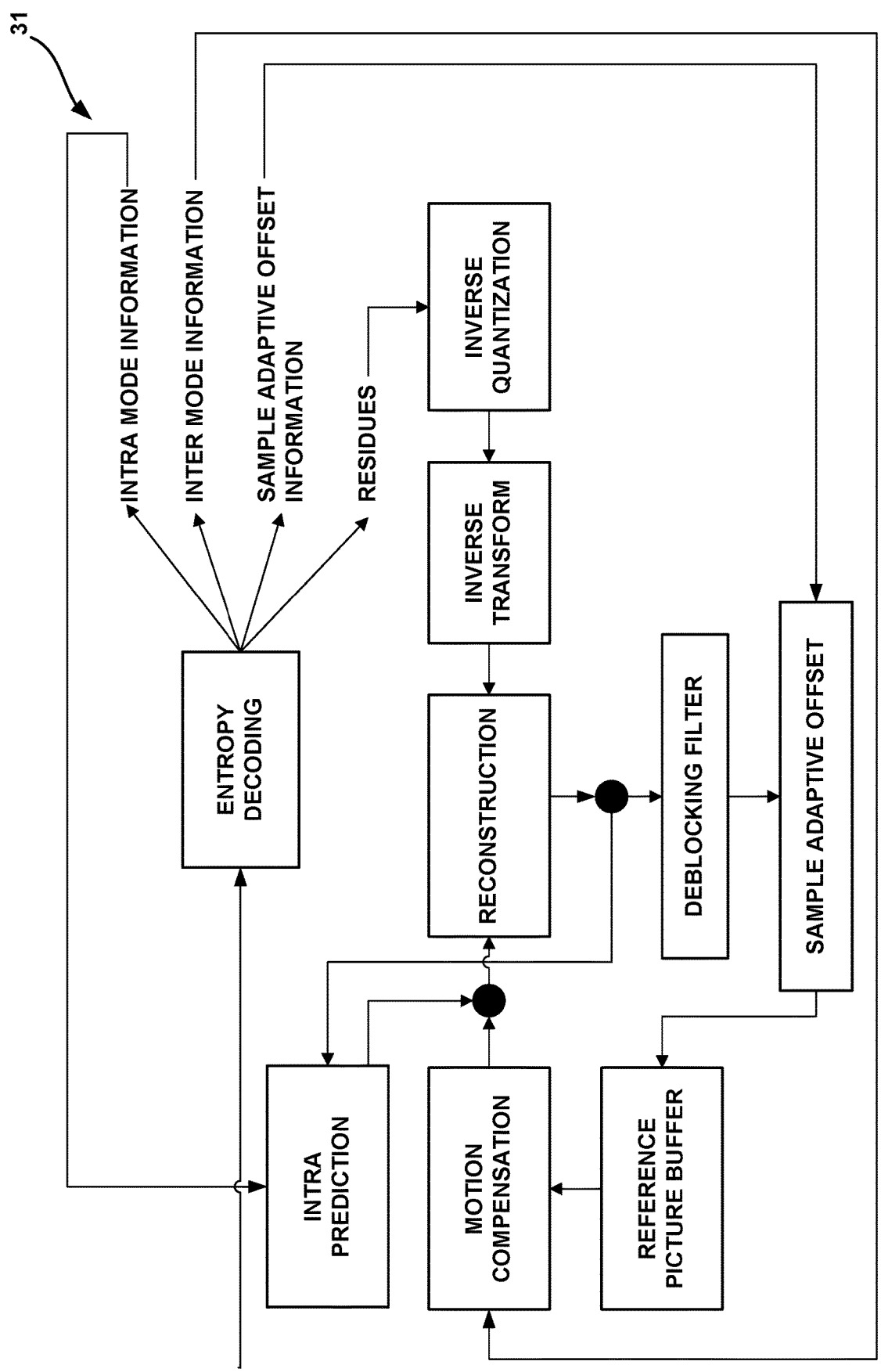
FIG. 2 shows an example block diagram of an HEVC decoder.

Aspects of HEVC and JEM techniques will now be discussed. FIG. 2 shows an example block diagram of HEVC decoder 31. Video decoder 31 shown in FIG. 2 generally corresponds to video decoder 30, but unlike video decoder 30, does not include an adaptive loop filter between reconstruction and the reference picture buffer. Video decoder 30 is illustrated in greater detail in FIG. 5. HEVC employs two in-loop filters, including a de-blocking filter (DBF) and a sample adaptive offset (SAO) filter. Additional details regarding HEVC decoding and SAO are described in C. Fu, E. Alshina, A. Alshin, Y. Huang, C. Chen, Chia. Tsai, C. Hsu, S. Lei, J. Park, W. Han, "Sample adaptive offset in the HEVC standard," IEEE Trans. Circuits Syst. Video Technol., 22(12): 1755-1764 (2012).

As illustrated in FIG. 2, the input to a DBF may be the reconstructed image after intra or inter prediction, as shown with the output from the reconstruction block. The DBF performs detection of the artifacts at the coded block boundaries and attenuates the artifacts by applying a selected filter. Compared to the H.264/AVC deblocking filter, the HEVC deblocking filter has lower computational complexity and better parallel processing capabilities while still achieving significant reduction of the visual artifacts. For additional examples, see A. Norkin, G. Bjontegaard, A. Fuldseth, M. Narroschke, M. Ikeda, K. Andersson, Minhua Zhou, G. Van der Auwera, "HEVC Deblocking Filter," IEEE Trans. Circuits Syst. Video Technol., 22(12): 1746-1754 (2012).

In HEVC, the deblocking filter decisions are made separately for each boundary of a four-sample length that lies on the grid dividing the picture into blocks of 8×8 samples. Deblocking is performed on a block boundary if the following conditions are true: (1) the block boundary is a prediction unit (PU) or transform unit (TU) boundary; (2) the boundary strength (Bs), as defined in Table 1 below, is greater than zero; (3) the variation of signal, as defined in Equation (1) below, on both sides of a block boundary is below a specified threshold.

TABLE 1

Boundary strength (Bs) values for boundaries between two neighboring luma blocks

| Conditions | Bs |
| --- | --- |
| At least one of the blocks is Intra coded | 2 |
| At least one of the blocks has a non-zero coded residual coefficient and boundary is a transform unit boundary | 1 |
| Absolute differences between corresponding spatial motion vector components of the two blocks are >=1 in units of integer pixels | 1 |
| Motion-compensated prediction for the two blocks refers to different reference pictures or the number of motion vectors is different for the two blocks | 1 |
| Otherwise | 0 |

If Bs>0 for a luma block boundary, then the deblocking filtering is applied to that boundary if the following condition holds:

$$|p_{2,0}-2p_{1,0}+p_{0,0}|+|p_{2,3}-2p_{1,3}+p_{0,3}|+|q_{2,0}-2q_{1,0}+q_{0,0}|+|q_{2,3}-2q_{1,3}+q_{0,3}|<\beta, \quad (1)$$

where p and q are luma sample values at the boundary and β is a threshold.

HEVC allows for two types of luma deblocking filters, namely: (i) normal filter, and (ii) strong filter. The choice of deblocking filter depends on whether particular signal variation terms are less than certain thresholds (see "HEVC Deblocking Filter" by Norkin et al (2012) cited above for details). Although the filtering decisions are based only on the two rows (or columns) of a four pixel long vertical (or horizontal, as the case may be) boundary, the filter is applied to every row (or column, as the case may be) in the boundary. The number of pixels used in the filtering process and the number of pixels that may be modified with each type of filtering is summarized in Table 2 below.

TABLE 2

Number of pixels used/modified per boundary in HEVC deblocking

| | Pixels used (on either side of boundary) | Pixels modified (on either side of boundary) |
| --- | --- | --- |
| Normal filter | 3 or 2 | 2 or 1 |
| Strong filter | 4 | 3 |

Chroma deblocking (i.e., deblocking filtering performed on chroma components) is performed only when Bs equals two (2). In HEVC, only one type of chroma deblocking filter is used. The chroma deblocking filter uses pixels $p_0$, $p_1$, $q_0$, $q_1$ and may modify pixels $p_0$ and $q_0$ in each row (the second subscript indicating the row index is omitted in the above description for brevity, because the filter is applied to every row). In JEM, deblocking is performed at the CU level. The size of CUs on either side of a boundary can be larger than 8×8. The minimum CU size in JEM is 4×4. Therefore, deblocking filter may also be applied to boundaries of 4×4 blocks.

The input to an SAO filter may be the reconstructed block after applying the deblocking filter, as shown with the output from the deblocking filter in FIG. 2. A video coder may apply an SAO filter to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a CTU.

Two SAO types that can satisfy the requirement of being low complexity were adopted in HEVC. Those two types are edge offset (EO) and band offset (BO) SAO, which are discussed in further detail below. Video encoder 20 and video decoder 30 may code an index of an SAO type. For EO, the sample classification is based on comparison between current samples and neighboring samples according to 1-D directional patterns: horizontal, vertical, 135° diagonal, and 45° diagonal.

Figures 3A, 3B, 3C, 3D:
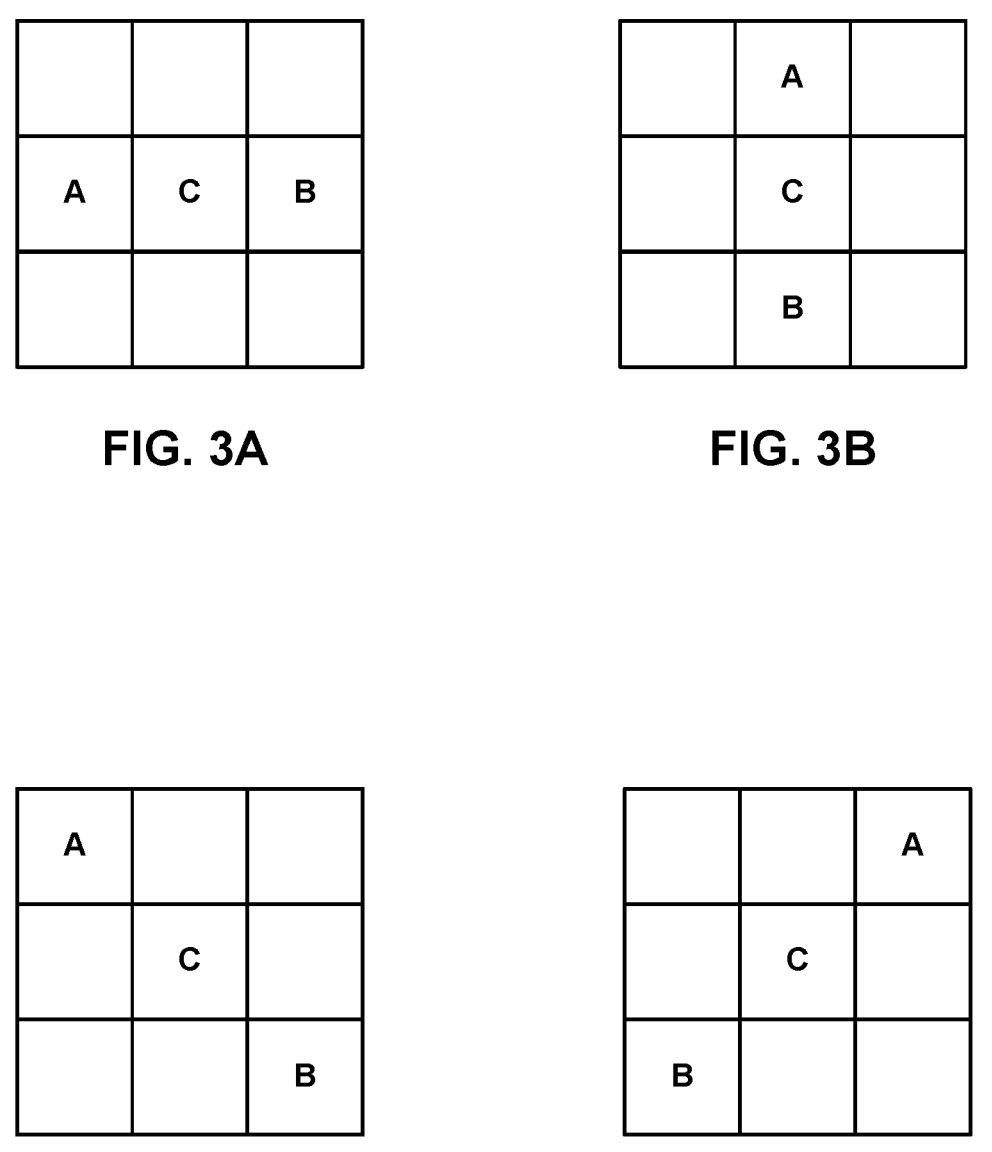

FIGS. 3A-3D show four 1-D directional patterns for EO sample classification: horizontal (FIG. 3A, EO class=0), vertical (FIG. 3B, EO class=1), 1350 diagonal (FIG. 3C, EO class=2), and 45° diagonal (FIG. 3D, EO class=3). Additional details related to SAO are described in C. Fu, E. Alshina, A. Alshin, Y. Huang, C. Chen, Chia. Tsai, C. Hsu, S. Lei, J. Park, W. Han, "Sample adaptive offset in the HEVC standard," IEEE Trans. Circuits Syst. Video Technol., 22(12): 1755-1764 (2012). In FIGS. 3A-3D, block C is the current block, and blocks A and B are neighboring blocks.

According to the selected EO pattern, five categories denoted by edgeIdx in Table 3 are further defined. For edgeIdx equal to 0-3, the magnitude of an offset may be signaled while the sign flag is implicitly coded, i.e., negative offset for edgeIdx equal to 0 or 1 and positive offset for edgeIdx equal to 2 or 3. For edgeIdx equal to 4, the offset is always set to 0 which means no operation is required for this case.

TABLE 3 classification for EO

| Category (edgeIdx) | Condition |
| --- | --- |
| 0 | C < A && C < B |
| 1 | (C < A && C == B) \|\| (C == A && C < B) |

TABLE 3-continued classification for EO

| Category (edgeIdx) | Condition |
|---|---|
| 2 | (C > A && C == B) \|\| (C == A && C > B) |
| 3 | C > A && C > B |
| 4 | None of the above |

For BO, the sample classification is based on sample values. Each color component may have its own SAO parameters for classification for BO type SAO filtering. BO implies that one offset is added to all samples of the same band. The sample value range is equally divided into 32 bands. For 8-bit samples ranging from 0 to 255, the width of a band is 8, and sample values from 8 k to 8 k+7 belong to band k, where k ranges from 0 to 31. One offset is added to all samples of the same band. The average difference between the original samples and reconstructed samples in a band (i.e., offset of a band) is signaled to the decoder (e.g., video decoder 30). There is no constraint on offset signs. Only offsets of four (4) consecutive bands and the starting band position are signaled to the decoder (e.g., video decoder 30).

Video encoder 20 and video decoder 30 may be configured to implement various adaptive loop filtering techniques set forth in JEM and/or working drafts of VVC. Aspects of some example JEM filtering techniques (e.g., ALF) will now be described. In addition to the modified de-blocking (DB) and HEVC SAO methods, JEM includes another filtering method called Geometry transformation-based Adaptive Loop Filtering (GALF). The input to an ALF/GALF may be the reconstructed image after the application of SAO (e.g., output of sample adaptive offset in FIG. 2). Aspects of GALF are described in Tsai, C. Y., Chen, C. Y., Yamakage, T., Chong, I. S., Huang, Y. W., Fu, C. M., Itoh, T., Watanabe, T., Chujoh, T., Karczewicz, M. and Lei, S. M., "Adaptive loop filtering for video coding", IEEE Journal of Selected Topics in Signal Processing, 7(6), pp. 934-945, 2013 and in M. Karczewicz, L. Zhang, W.-J. Chien, and X. Li, "Geometry transformation-based adaptive in-loop filter", Picture Coding Symposium (PCS), 2016.

ALF techniques attempt to minimize the mean square error between the original samples and decoded/reconstructed samples by using an adaptive Wiener filter. Denote the input image asp, the source image as S, and the finite impulse response (FIR) filter as h. Then the following expression of the sum of squared errors (SSE) should be minimized, where (x,y) denotes any pixel position in p or S.

$$SSE = \Sigma_{x,y}(\Sigma_{i,j}h(i,j)p(x-i,y-j) - S(x,y))^2$$

The optimal h, denoted as $h_{opt}$, can be obtained by setting the partial derivative of SSE with respect to h(i,j) equal to 0 as follows:

$$\frac{\partial SSE}{\partial h(i,j)} = 0$$

This leads to the Wiener-Hopf equation shown below, which gives the optimal filter $h_{opt}$:

$$\Sigma_{i,j}h_{opt}(i,j)(\Sigma_{x,y}p(x-i,y-j)p(x-m,y-n)) = \Sigma_{x,y}S(x,y)p(x-m,y-n)$$

In some examples of JEM or VVC, instead of using one filter for the whole picture, video encoder 20 and/or video decoder 30 may be configured to classify samples in a picture into twenty-five (25) classes based on the local gradients. Video encoder 20 and/or video decoder 30 may derive separate optimal Wiener filters for the pixels in each class. Several techniques have been employed to increase the effectiveness of adaptive loop filtering by reducing signaling overhead and computational complexity. Some of the techniques that can be used to increase ALF effectiveness by reducing signaling overhead and/or computational complexity are listed below:

1. Prediction from fixed filters: Optimal filter coefficients for each class are predicted using a prediction pool of fixed filters which include 16 candidate filters for each class. The best prediction candidate is selected for each class and only the prediction errors are transmitted.
2. Class merging: Instead of using twenty five (25) different filters (one for each class), pixels in multiple classes can share one filter in order to reduce the number of filter parameters to be coded. Merging two classes can lead to higher cumulative SSE but lower Rate-Distortion (RD) cost.
3. Variable number of taps: The number of filter taps is adaptive at the frame level. Theoretically, filters with more taps can achieve lower SSE, but may not be a good choice in terms of RD cost, because of the bit overhead associated with more filter coefficients.
4. Block level on/off control: ALF can be turned on and off (enabled or disabled) on a block basis. The block size at which the on/off control flag is signaled is adaptively selected at the frame level. Filter coefficients may be recomputed using pixels from only those blocks for which an ALF is enabled (i.e., an ALF is used).
5. Temporal prediction: Filters derived for previously coded frames are stored in a buffer. If the current frame is a P or B frame, then one of the stored set of filters may be used to filter this frame if it leads to better RD cost. A flag is signaled to indicate usage of temporal prediction. If temporal prediction is used, then an index indicating which set of stored filters is used is signaled. No additional signaling of ALF coefficients is needed. Block level ALF on/off control flags may be also signaled for a frame using temporal prediction.

Details of some aspects of ALF are summarized in this and the following paragraphs. Some aspects of ALF are related to pixel classification and geometry transformation. In one example, video encoder 20 and video decoder 30 may be configured to compute sums of absolute values of vertical, horizontal and diagonal Laplacians at all pixels within a 6×6 window that covers each pixel in a reconstructed frame (before ALF). Video encoder 20 and video decoder 30 divide the reconstructed frame into non-overlapped 2×2 blocks. Video encoder 20 and video decoder 30 classify the four pixels in these blocks into one of twenty five (25) categories, denoted as $C_k$ (k=0, 1, . . . , 24), based on the total Laplacian activity and directionality of that block. Additionally, video encoder 20 and video decoder 30 apply one of four geometry transformations (no transformation, diagonal flip, vertical flip, or rotation) to the filters based on the gradient directionality of that block. Additional details can be found in M. Karczewicz, L. Zhang, W.-J. Chien, and X. Li, "Geometry transformation-based adaptive in-loop filter," Picture Coding Symposium (PCS), 2016.

Some aspects of adaptive loop filtering are related to filter derivation and prediction from fixed filters. For each class $C_k$, video encoder 20 and video decoder 30 first determine a best prediction filter from the pool for $C_k$, denoted as $h_{pred,k}$, based on the SSE given by the filters. The SSE of $C_k$, which is to be minimized, can be written as below, $$SSE_k = \Sigma_{x,y}(\Sigma_{i,j}(h_{pred,k}(i,j)+h_{\Delta,k}(i,j))p(x-i,y-j)-S(x,y))^2,$$
$$k=0,\ldots,24, (x,y) \in C_k,$$

where $h_{\Delta,k}$ is the difference between the optimal filter for $C_k$ and $h_{pred,k}$. Let $p'(x,y)=\Sigma_{i,j}h_{pred,k}(i,j)p(x-i,y-j)$ be the result of filtering pixel $p(x,y)$ by $h_{pred,k}$. Then the expression for $SSE_k$ can be re-written as $$SSE_k = \sum_{x,y}\left(\sum_{i,j}h_{\Delta,k}(i,j)p(x-i,y-j) - (S(x,y) - p'(x,y))\right)^2$$
$$k = 0, \ldots, 24, (x,y) \in C_k$$

By making the partial derivative of SSE with respect to $h_{\Delta,k}(i,j)$ equal to 0, the modified Wiener-Hopf equation is obtained as follows:

$$\sum_{i,j}h_{\Delta,k}(i,j)\left(\sum_{x,y}p(x-i,y-j)p(x-m,y-n)\right) =$$
$$\sum_{x,y}(S(x,y) - p'(x,y))p(x-m,y-n)$$
$$k = 0, \ldots, 24, (x,y) \in C_k$$

For the simplicity of expression, denote $\Sigma_{x,y}p(x-i,y-j)p(x-m,y-n)$ and $\Sigma_{x,y}(S(x,y)-p'(x,y))p(x-m,y-n)$ with $(x,y) \in C_k$ by $R_{pp,k}(i-m,j-n)$ and $R'_{ps,k}(m,n)$, respectively. Then, the above equation can be written as:

$$\Sigma_{i,j}h_{\Delta,k}(i,j)R_{pp,k}(i-m,j-n)=R'_{ps,k}(m,n) \quad k=0,\ldots,24 \quad (1)$$

For every $C_k$, the auto-correlation matrix $R_{pp,k}(i-m,j-n)$ and cross-correlation vector $R'_{ps,k}(m,n)$ are computed over all $(x,y) \in C_k$.

In one example of adaptive loop filtering, video encoder 20 calculates and transmits only the difference between the optimal filter and the fixed prediction filter. If none of the candidate filters available in the pool is a good predictor, then video encoder 20 and video decoder 30 uses the identity filter (i.e., the filter with only one non-zero coefficient equal to 1 at the center that makes the input and output identical) as the predictor.

Some aspects of adaptive loop filtering relate to the merging of pixel classes. Classes are merged to reduce the overhead of signaling filter coefficients. The cost of merging two classes is increased with respect to SSE. Consider two classes $C_m$ and $C_n$ with SSEs given by $SSE_m$ and $SSE_n$, respectively. Let $C_{m+n}$ denote the class obtained by merging $C_m$ and $C_n$ with SSE, denoted as $SSE_{m+n}$. $SSE_{m+n}$ is always greater than or equal to $SSE_m+SSE_n$. Let $\Delta SSE_{m+n}$ denote the increase in SSE caused by merging $C_m$ and $C_n$, which is equal to $SSE_{m+n}-(SSE_m+SSE_n)$. To calculate $SSE_{m+n}$, video encoder 20 may derive $h_{\Delta,m+n}$, the filter prediction error for $C_{m+n}$, using the following expression similar to (1):

$$\Sigma_{i,j}h_{\Delta,m+n}(i,j)(R_{pp,m}(i-u,j-v)+R_{pp,n}(i-u,j-v))=R'_{ps,m}(u,v)+R'_{ps,n}(u,v) \quad (2)$$

Video encoder 20 may calculate the SSE for the merged category $C_{m+n}$ as:

$$SSE_{m+n}=-\Sigma_{u,v}h_{\Delta,m+n}(u,v)(R'_{ps,m}(u,v)+R'_{ps,n}(u,v))+(R_{ss,m}+R_{ss,n})$$

To reduce the number of classes from N to N−1, two classes, $C_m$ and $C_n$, may need to be found, such that merging them leads to the smallest $\Delta SSE_{m+n}$ compared to any other combinations. In some ALF designs, video encoder 20 is configured to check every pair of available classes for merging to find the pair with the smallest merge cost.

If $C_m$ and $C_n$ (with m<n) are merged, then video encoder 20 and video decoder 30 may mark $C_n$ as unavailable for further merging and the auto- and cross-correlations for $C_m$ are changed to the combined auto- and cross-correlations as follows:

$$R_{pp,m}=R_{pp,m}+R_{pp,n}$$
$$R'_{ps,m}=R'_{ps,m}+R'_{ps,n}$$
$$R_{ss,m}=R_{ss,m}+R_{ss,n}.$$

Video encoder 20 may determine an optimal number of ALF classes after merging for each frame based on the RD cost. In one example, this is done by starting with twenty-five (25) classes and merging a pair of classes (from the set of available classes) successively until there is only one class left. For each possible number of classes (1, 2, ..., 25) left after merging, video encoder 20 may store a map indicating which classes are merged together. Video encoder 20 then selects the optimal number of classes such that the RD cost is minimized as follows:

$$N_{opt} = \underset{N}{\operatorname{argmin}}(J|_N = D|_N + \lambda R|_N),$$

where $D|_N$ is the total SSE of using N classes ($D|_N = \Sigma_{k=0}^{N-1} SSE_k$), $R|_N$ is the total number of bits used to code the N filters, and $\lambda$ is the weighting factor determined by the quantization parameter (QP). Video encoder 20 may transmit the merge map for $N_{opt}$ number of classes, indicating which classes are merged together, to video decoder 30.

Aspects of signaling ALF parameters are described below. A brief step-by-step description of an example ALF parameter encoding process performed by video encoder 20 is given below. Video decoder 30 may be configured to perform a reciprocal process (e.g., signal from the perspective of video decoder 30 is the reception of syntax elements).
1. Signal the frame level ALF on/off flag.
2. If ALF is on, then signal the temporal prediction flag indicating the usage of the filters from the previous pictures.
3. If temporal prediction is used, then signal the index of the frame from which the corresponding ALF parameters are used for filtering the current frame.
4. If temporal prediction is not used, then signal the auxiliary ALF information and filter coefficients as follows:
   a. The following auxiliary ALF information may be signaled before signaling the filter coefficients. The auxiliary ALF information may include:
      i. The number of unique filters used after class merging.
      ii. Number of filter taps.
      iii. Class merge information indicating which classes share the filter prediction errors.
      iv. Index of the fixed filter predictor for each class.
   b. After signaling the auxiliary ALF information, filter coefficient prediction errors may be signaled as follows:
      i. A flag is signaled to indicate if the filter prediction errors are forced to zero (0) for some of the remaining classes after merging.

ii. A flag is signaled to indicate if differential coding is used for signaling filter prediction errors (if the number of classes left after merging is larger than one (1)).
   iii. Filter coefficient prediction errors are then signaled using k-th order Exp-Golomb code, where the k-value for different coefficient positions is selected empirically.
c. Filter coefficients for chroma components, if available, are directly coded without any prediction methods.
5. Finally, the block-level ALF on/off control flags are signaled.

The design of adaptive loop filtering in some examples of JEM may present one or more potential problems. As one example, some example adaptive loop filtering designs perform multiple passes over each frame to design one set of filters (e.g., one filter for each class of pixels or one filter shared among multiple classes in the frame) for the whole frame. Such techniques introduce high encoder latency. High encoder latency may be especially problematic in low delay applications, such as video conferencing, where it may be important to send even a partly encoded frame to the channel as soon as possible.

As another example, according to some adaptive loop filtering designs, one set of filters is used for the whole picture. The local statistics in a small block of the original picture and reconstructed picture may be different than the cumulative statistics obtained using the whole picture. Therefore, an ALF which is optimal for the whole picture may not be optimal for a given block.

As another example, a potential problem with designing a new set of Wiener filters using a small block of a picture in order to obtain better local adaptivity is that the number of pixels available in a small block may not be enough for video encoder 20 to determine a good estimate of the correlation matrices and vectors. This may lead to ill-posed Wiener-Hopf equations, which in turn may output less than optimal ALF coefficients.

As another example, some example adaptive loop filtering designs define sixteen (16) fixed filters for each of the twenty-five (25) classes, thereby yielding a total of four hundred (400) filters. These filters may be used as predictor filters for the final filter coefficients for each class. The index of the predictor filter used is signaled for each class. This may cause high signaling overhead and reduce overall coding gain.

Another potential disadvantage of using a fixed set of filters as predictors is that the predictor set is not modified based on the new filters designed for previous frames. Because temporally neighboring frames are likely to have similar statistics, using the optimal filters for previous frames can lead to efficient prediction of optimal filters for the current frame.

As another example, some example adaptive loop filtering designs require two passes over the current frame to make block-level filter on/off decisions. This introduces additional encoder latency. The blocks for which ALF on/off flags are signaled do not align with coding units (CUs). Therefore, CU information such as mode, coded block flag, etc. cannot be considered in an ALF on/off control decision. Using this information may reduce on/off signaling overhead.

To address one or more of the problems discussed above, this disclosure describes techniques to further improve the coding gains and visual quality obtained by using adaptive loop filtering. Video encoder 20 and/or video decoder 30 may apply any of the following itemized techniques individually. Alternatively, video encoder 20 and/or video decoder 30 may apply any combination of the itemized techniques discussed below.

According to one example technique of this disclosure, video encoder 20 may signal a set of adaptive loop filters per block in one picture/slice/tile. For example, for each block of video data in a picture, slice, or tile of video data, video encoder 20 may be configured to encode one or more syntax elements indicating a set of adaptive loop filters to use for the block. Video decoder 30 may be configured to decode the one or more syntax elements for each block to determine the set of adaptive loop filters to use for the block.

In one example, video encoder 20 may be configured to indicate the ALF set (e.g., the set of adaptive loop filters mentioned above) by encoding a set index to a list of filter sets (e.g., the plurality of sets of adaptive loop filters). In this disclosure, the term "filter set" may refer to a single set of adaptive loop filters, the term "filter sets" may refer to a plurality of sets of adaptive loop filters, and the term "filter set list" may refer to a list of the plurality of sets of adaptive loop filters. In one example, the filter set list may include a plurality of sets of adaptive loop filters. That is, the filter set list may include all the determined possible filter sets (i.e., the plurality of sets of adaptive loop filters) for the picture/slice/tile. The index, in some examples, identifies a particular set of adaptive loop filters from among the plurality of sets of adaptive loop filters included in the list. Video decoder 30 may be configured to store and/or determine the plurality of sets of adaptive loop filters according to predetermined rules. As will be discussed below, the plurality of sets of adaptive loop filters may include pre-trained filters, adaptive loop filters that are signaled for a current picture, and adaptive loop filters that are reused from previous pictures. In one example, for a particular set of adaptive loop filters, each respective set of the particular set of adaptive loop filters includes one or more of a current adaptive loop filter signaled for a current picture or a pre-trained adaptive loop filter. Video decoder 30 may be configured to decode the index sent by video encoder 20 and determine the set of adaptive loop filters, from among the plurality of sets of adaptive loop filters, to use for a particular block of video data.

In this way, video encoder 20 and video decoder 30 may be configured to determine a respective set of adaptive loop filters, from among a plurality of sets of adaptive loop filters, per block of the current picture for blocks in which adaptive loop filtering is used. In one example of the disclosure, each respective set of adaptive loop filters includes a previous adaptive loop filter used in one or more previous pictures. Video encoder 20 and video decoder 30 may be configured to determine a respective set of adaptive loop filters for a respective block of the current picture in the case that adaptive loop filtering is enabled for the block (e.g., as indicated by an ALF on/off flag).

Video encoder 20 and video decoder 30 may further be configured to adaptive loop filter the blocks of the current picture in accordance with the respective sets of adaptive loop filters. For example, as described above, video encoder 20 and video decoder 30 may be configured to classify the samples of the block and then use the adaptive loop filter in the respective set of adaptive loop filters that is associated with the classification. In another example, video encoder 20 may be configured to signal a syntax element that indicates which adaptive loop filter in the respective set of adaptive loop filters to use for the current block. Accordingly, in one example, video encoder 20 and video decoder 30 may be configured to code a respective flag per block indicating if adaptive loop filtering is used for the respective block (e.g., a block-level ALF on/off flag), and code, based on the respective flag per block, a respective syntax element indicating the respective set of adaptive loop filters, from among the plurality of sets of adaptive loop filters, per block of the current picture. In some examples, video encoder 20 and video decoder 30 would not code the respective syntax element indicating the respective set of adaptive loop filters in the case that adaptive loop filtering is not used for the current block (e.g., the block-level ALF flag indicates that adaptive loop filtering is off and/or not enabled).

In the above examples, the "block" of the current picture may be defined as any size of block. In one example, the block can be the coding tree unit (CTU) or any other block. The block can be decoupled from the partitioning. In the case that the block is a CTU, video encoder 20 and video decoder 30 may be configured to use the set of adaptive loop filters singled for the CTU for all blocks partitioned from the CTU.

In one example, video encoder 20 and video decoder 30 may be configured to determine a list of the plurality of sets of adaptive loop filters. Video encoder 20 and video decoder 30 may be configured to determine such a list per picture, per slice, or per tile. Each set of adaptive loop filters of the plurality of sets of adaptive loop filters may be configured such that each possible classification of samples has an associated filter. That is, each set may contain a filter assigned per class. As described above, video encoder 20 and video decoder 30 may be configured to code a set index into the list of the plurality of sets of adaptive loop filters per block. In one example, the list of the plurality of sets of adaptive loop filters may be a table, where each entry in the table is a particular set of adaptive loop filters. In addition, video encoder 20 and video decoder 30 may be configured to code a flag per block to indicate whether or not an ALF is used (e.g., a block-level ALF on/off flag). The list of the plurality of sets of adaptive loop filters may include one or more pre-trained filters, one or more filters derived using filters from previous pictures, and/or filters signaled in the bitstream for the current picture.

According to some examples of this disclosure, video encoder 20 and/or video decoder 30 may share the list of the plurality of filter sets across different pictures (e.g., an adaptive loop filter used for a previous picture is included in a set of the plurality of filter sets used for coding a current block). In one example, the filter set list can be initialized with pre-trained filters. After coding a picture, video encoder 20 may derive a new filter set based on the encoded picture and add the new filter set to the filter set list. Alternatively, the new filter set can replace an existing filter set in the list. After coding another picture, video encoder 20 may derive another filter set and include the derived filter set in the filter set list. In this example, the filter set list is common for all pictures and may be updated after coding a picture. From the decoder side, video decoder 30 may detect a signaling of the new filter set after decoding a picture or prior to the decoding of a picture.

According to some examples of this disclosure, video encoder 20 may be configured to signal (e.g., encode) syntax elements of a new set of filters per picture, per slice, and/or per tile. Video decoder 30 may be configured to determine the new set of filters based on the signaling from video encoder 20 and add the new set of filters to the list including the plurality of sets of filters.

In one example, video encoder 20 and video decoder 30 may be configured to add the new set of filters to the filter set list. The updated list can then be used to filter a block in the next picture or pictures. In another example, video encoder 20 and video decoder 30 may be configured to use the updated list (e.g., containing the new set of filters derived using the current picture/slice/tile) to filter a block in the current picture/slice/tile.

According to some examples of this disclosure, video encoder 20 and video decoder 30 may update the filter set list (e.g., the list of the plurality of sets of adaptive loop filters) with filters derived using previous pictures, previous slices, and/or previous tiles. The order in which video encoder 20 and video decoder 30 may be configured to add the sets of adaptive loop filters in the filter set list can be fixed, predefined, or flexible. The list can be re-ordered per picture based on information related to the current picture and information related to the pictures from which corresponding filters in the list are derived. Video encoder 20 may indicate a filter set to video decoder 30 using an index in the filter set list. In some examples, video encoder 20 may assign a smaller index value to more frequently-used filters or newly-added filters.

In one example, video encoder 20 and video decoder 30 may be configured to add the newly derived filter set to the beginning of the list. In another example, video encoder 20 and video decoder 30 may be configured to add the sets of filters derived using previous frames (e.g., previous adaptive loop filters) in the list after the currently-signaled filters and before existing filter sets in the list (e.g., the sets of pre-trained fixed filters). In another example, video encoder 20 and video decoder 30 may be configured to add adaptive loop filters to each respective set of adaptive loop filters so that current adaptive loop filters are added first, previous adaptive loop filters are added second, and pre-trained adaptive loop filters are added last.

In another example of the disclosure, the ordering of filter sets in the list may depend on other picture-related information. For example, filters derived from pictures in the same temporal layer as the current picture may be placed in the list before filters derived using pictures in another temporal layer. In another example, the index of a filter set in the list may depend on whether the corresponding picture from which it is derived is a reference picture used for prediction of the current picture. Video encoder 20 and video decoder 30 may be configured to add filters corresponding to a more frequently used reference picture before filters derived from other reference pictures. Ordering filter sets in this manner may result in syntax elements (e.g., indices in the filter set list) with fewer bits for the most frequently used filter sets in the filter set list. Accordingly, fewer bits may be used to signal the filter set used for the block, thus increasing coding efficiency.

In another example, video encoder 20 and video decoder 30 may be configured to add filters derived using pictures coded with a similar quantization parameter (QP) to the current picture before filters derived from previous pictures coded with a different QP.

In another example of the disclosure, video encoder 20 and video decoder 30 may be configured to limit the maximum number of sets of filters in the filter set list. In one example, up to thirty-two (32) sets of filters can be kept in the filter set list. In some examples, video encoder 20 may be configured to signal the maximum number of filter sets in the list in the slice header, sequence parameter set, picture parameter set, in other high-level syntax information, or elsewhere.

In another example of the disclosure, video encoder 20 can use a different number of bits to signal different filter set indexes. Fewer bits can be used to indicate a lower index position in the list (because filter sets near the top of a list are more likely to be selected) as compared to a higher index position. Again, this may result in fewer bits being used to signal the filter set used for the block more often, thus increasing coding efficiency.

According to some examples of this disclosure, video encoder 20 and video decoder 30 may be configured to share ALF information for some blocks (e.g., merging of the ALF information across two or more blocks). In one example, video encoder 20 and video decoder 30 may be configured to share the index of the set of filters and/or ALF on/off flag (this flag indicates whether adaptive loop filtering is applied to a block) across multiple blocks. An ALF merge indicator may indicate which blocks are merged, and which ALF information is associated with the ALF merge indicator. The merge indicator can be an index, a flag, or any other syntax element.

In one example, video encoder 20 and video decoder 30 may be configured to merge ALF information of a block with a block above, or with a block to the left. In other examples, more flexible ALF information merging that allows merging of one block with any other block (i.e., not necessarily a neighboring block) in the picture can also be used.

In some examples of this disclosure, video decoder 30 may be configured to derive the ALF on/off flag based on other existing block information. In one example, video decoder 30 may derive the ALF on/off flag based on existing block information, and as such, video encoder 20 may not signal the ALF on/off flag. Video encoder 20 may signal ALF on/off flag for a group of blocks, denoted as an ALF block. The size of an ALF block may be predetermined, or may be signalled by video encoder 20. In one example, blocks sharing the same ALF on/off flag can represent an ALF block. In another example, the ALF block may be equal to a block.

a. In one example, video encoder 20 and video decoder 30 may be configured to derive the ALF on/off flag based on the number of blocks in an ALF block, which share the same ALF on/off flag, having non-zero coded block flags (CBFs). A CBF indicates if a block includes any significant (e.g., non-zero transform coefficients). A value of "1" for the CBF indicates that the block includes non-zero transform coefficients. If the number of non-zero CBFs is less than a certain threshold, then ALF may be disabled, or a default ALF filter may be applied to those blocks in the ALF block.
  b. In the example of sub-bullet 'a' above, the number of non-zero transform coefficients can be counted instead of CBFs. A threshold can be introduced for the counted coefficients, and if the number of non-zero transform coefficients is less than the threshold, adaptive loop filtering may be disabled for the blocks included in the ALF block, or a default ALF filter may be applied to those blocks.
  c. In another example, if the number of blocks in an ALF block coded with skip mode is larger than a certain threshold then adaptive loop filtering may be disabled for those blocks in the ALF block. The techniques of sub-bullet 'c' may be used together with the techniques of sub-bullet 'a' and 'b' in any combination.
  d. In the example of sub-bullet 'c' above, the skip mode is used as an example, and other coding modes (e.g., a particular mode such as a particular intra prediction direction, particular inter prediction mode, etc.) can be utilized in deriving the ALF on/off flag.

Figure 4:
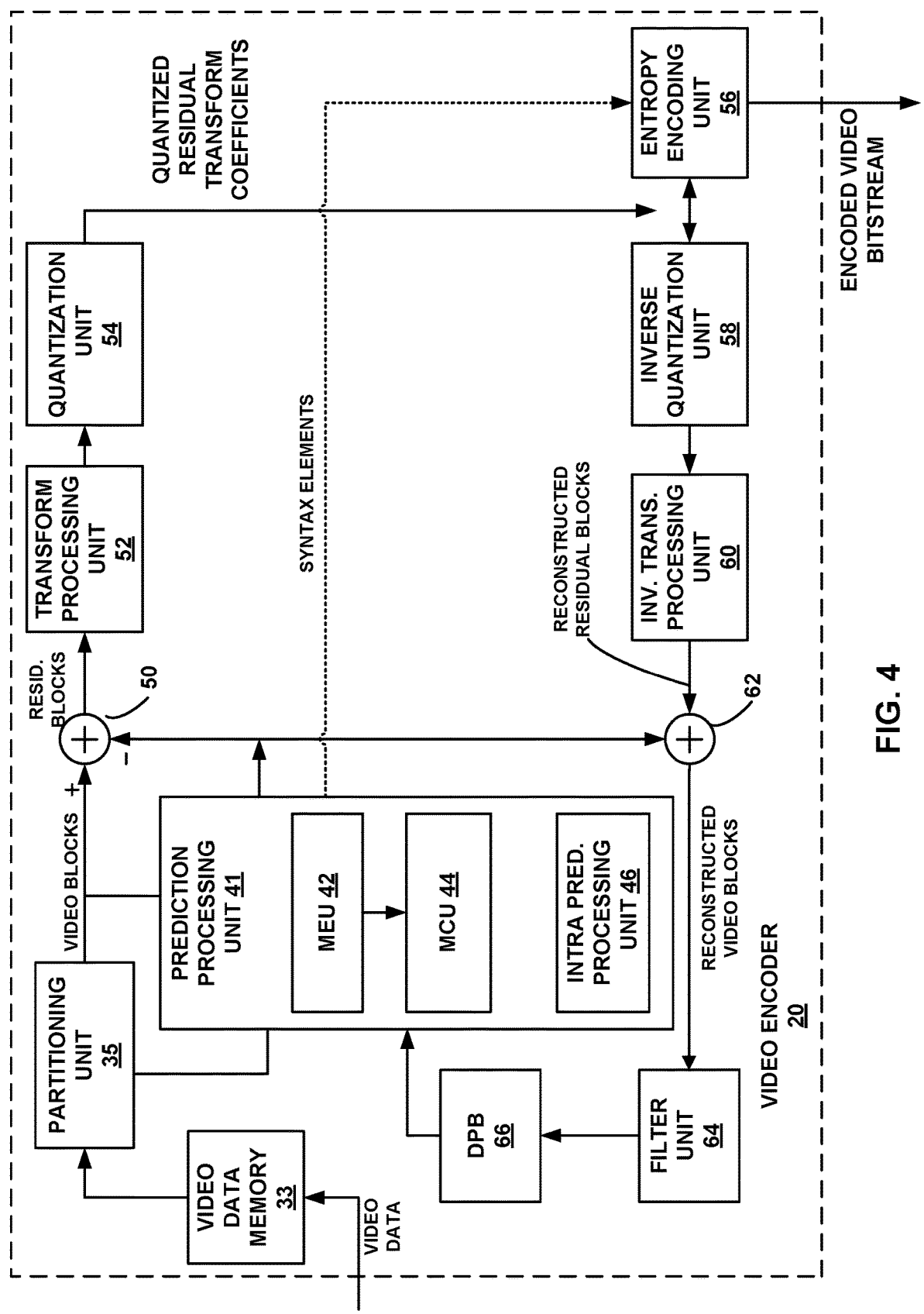
FIG. 4 is a block diagram illustrating an example video encoder that may implement the techniques described in this disclosure.

FIG. 4 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial-based compression modes. Inter-modes, such as uni-directional prediction (P mode) or bi-prediction (B mode), may refer to any of several temporal-based compression modes.

In the example of FIG. 4, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 4, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded provided by prediction processing unit 41.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

In addition, filter unit 64 may be configured to perform any of the techniques in this disclosure related to adaptive loop filtering. In particular, as described above, filter unit 64 may be configured to determine a respective set of adaptive loop filters, from among a plurality of sets of adaptive loop filters, per block of the current picture for blocks in which adaptive loop filtering is used, wherein each respective set of adaptive loop filters includes a previous adaptive loop filter used in one or more previous pictures, and adaptive loop filter the blocks of the current picture in accordance with the respective sets of adaptive loop filters.

Figure 5:
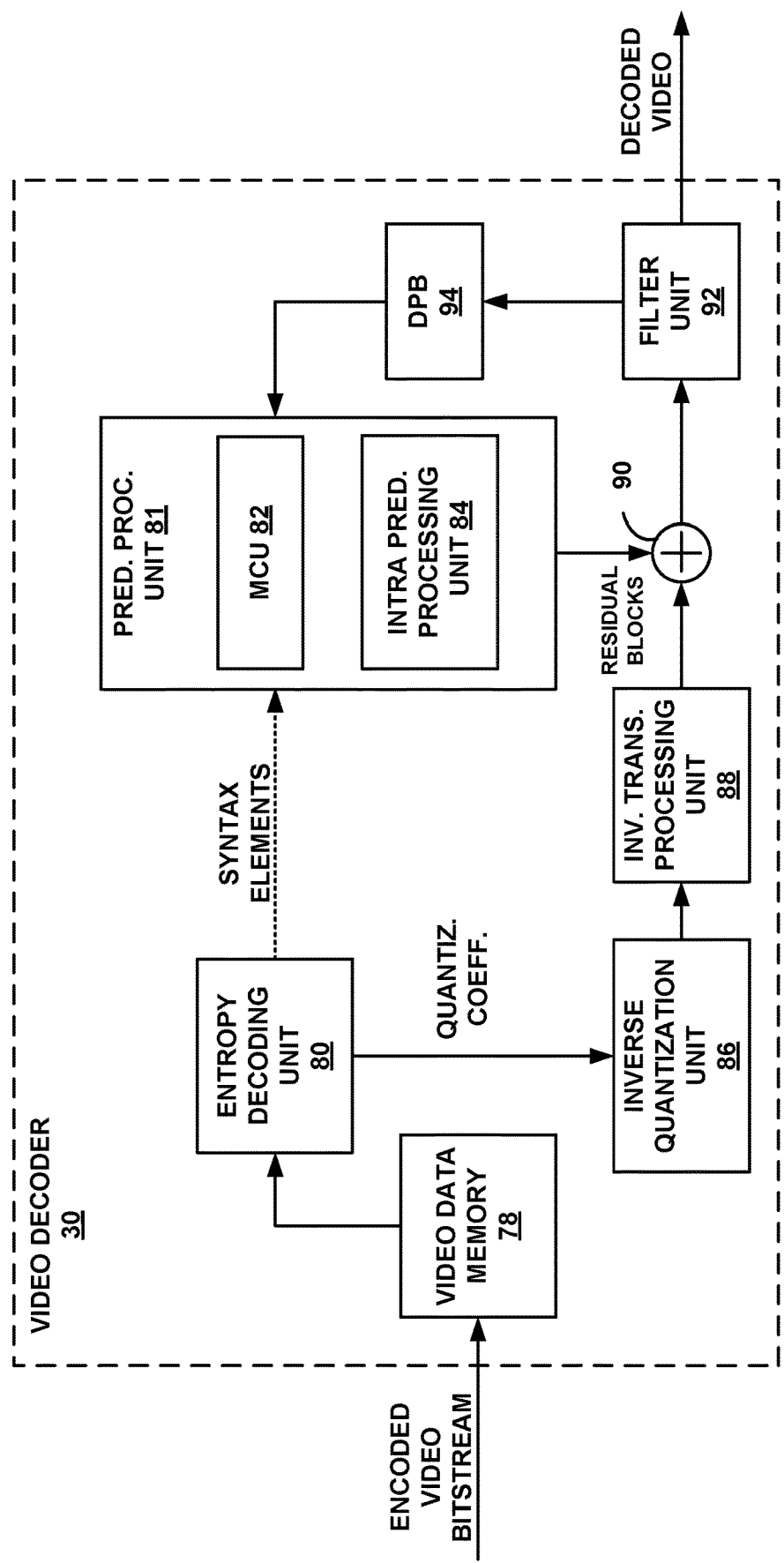
FIG. 5 is a block diagram illustrating an example video decoder that may implement the techniques described in this disclosure.

FIG. 5 is a block diagram illustrating an example video decoder 30 that may implement the techniques described in this disclosure. Video decoder 30 of FIG. 5 may, for example, be configured to receive the signaling described above with respect to video encoder 20 of FIG. 4. In the example of FIG. 5, video decoder 30 includes video data memory 78, entropy decoding unit 80, prediction processing unit 81, inverse quantization unit 86, inverse transform processing unit 88, summer 90, DPB 94, and filter unit 92. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 4.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Filter unit 92 filters the reconstructed block (e.g. the output of summer 90) and stores the filtered reconstructed block in DPB 94 for uses as a reference block. The reference block may be used by motion compensation unit 82 as a reference block to inter-predict a block in a subsequent video frame or picture. Filter unit 92 may perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

In addition, filter unit 92 may be configured to perform any of the techniques in this disclosure related to adaptive loop filtering. In particular, as described above, filter unit 92 may be configured to determine a respective set of adaptive loop filters, from among a plurality of sets of adaptive loop filters, per block of the current picture for blocks in which adaptive loop filtering is used, wherein each respective set of adaptive loop filters includes a previous adaptive loop filter used in one or more previous pictures, and adaptive loop filter the blocks of the current picture in accordance with the respective sets of adaptive loop filters.

Figure 6:
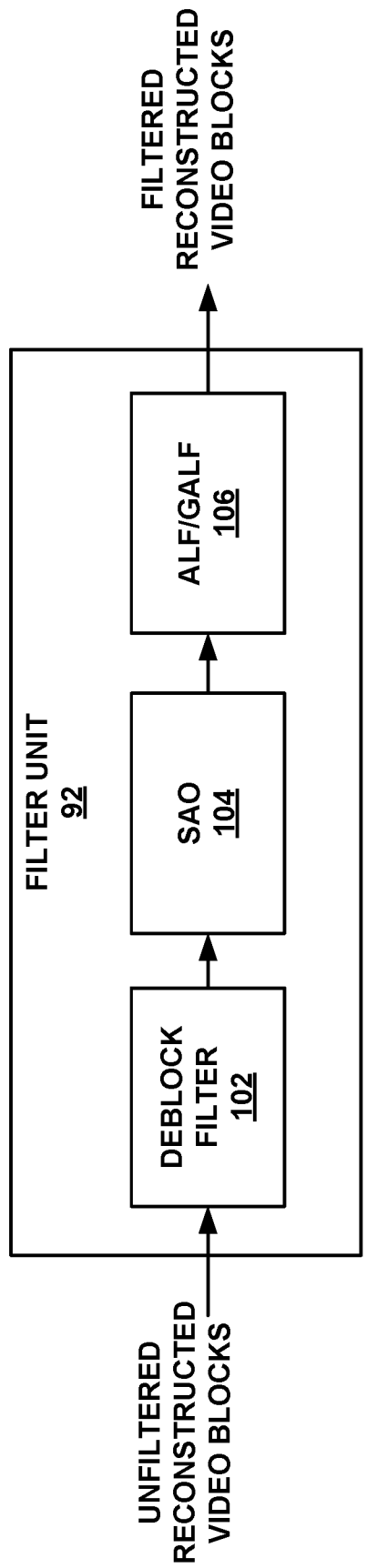
FIG. 6 shows an example implementation of a filter unit for performing the techniques of this disclosure.

FIG. 6 shows an example implementation of filter unit 92. Filter unit 64 may be implemented in the same manner. Filter units 64 and 92 may perform the techniques of this disclosure, possibly in conjunction with other components of video encoder 20 or video decoder 30. In the example of FIG. 6, filter unit 92 includes deblock filter 102, SAO filter 104, and ALF/GALF filter 106. SAO filter 104 may, for example, be configured to determine offset values for samples of a block in the manner described in this disclosure. ALF/GALF filter 106 may be configured to determine a respective set of adaptive loop filters, from among a plurality of sets of adaptive loop filters, per block of the current picture for blocks in which adaptive loop filtering is used, wherein each respective set of adaptive loop filters includes a previous adaptive loop filter used in one or more previous pictures, and adaptive loop filter the blocks of the current picture in accordance with the respective sets of adaptive loop filters.

Filter unit 92 may include fewer filters and/or may include additional filters. Additionally, the particular filters shown in FIG. 6 may be implemented in a different order. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 7:
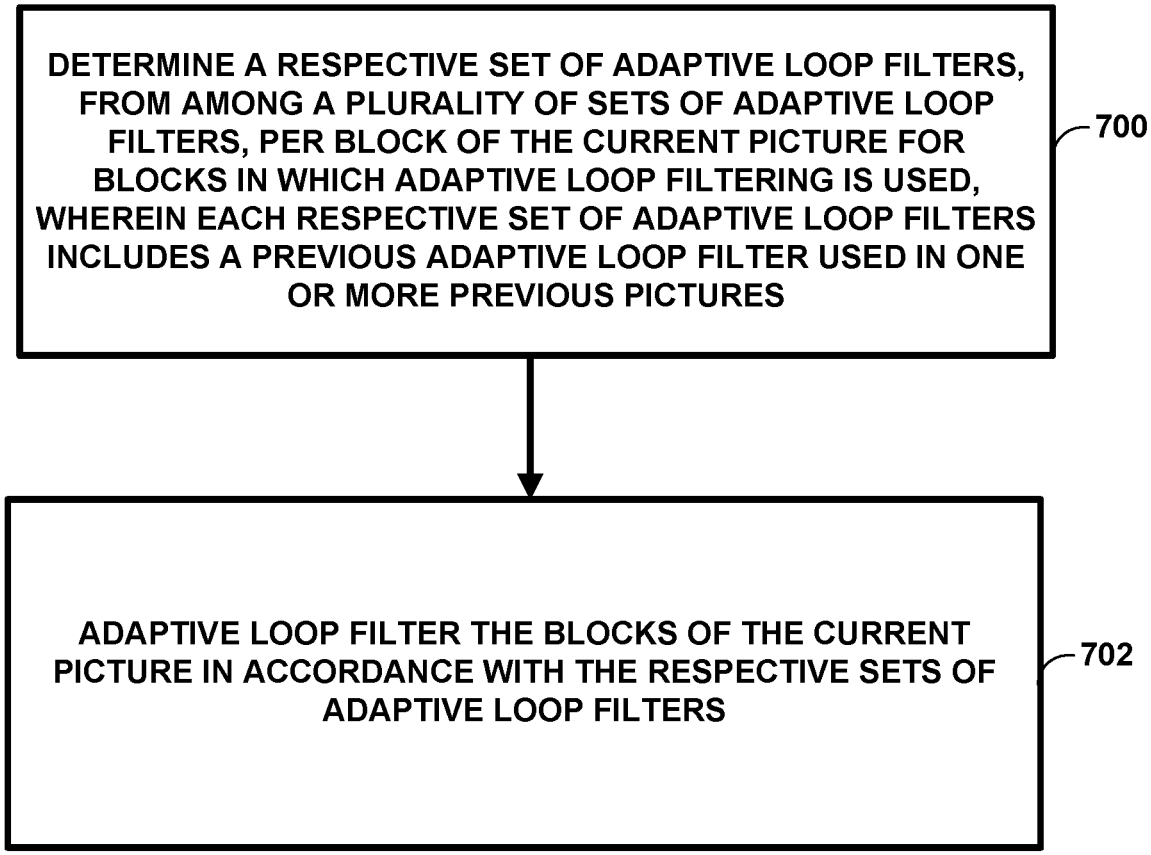
FIG. 7 is a flowchart illustrating an example method of the disclosure.

FIG. 7 is a flowchart illustrating an example method of the disclosure. The techniques of FIG. 7 may be performed by one or more structural units of video encoder 20 and video decoder 30, including filter unit 64 and filter unit 92. As discussed above, the term "coding" generically refers to both encoding and decoding. Likewise, the term "code" generically refers to both encode and decode.

In one example of the disclosure, video encoder 20 and video decoder 30 may be configured to determine a respective set of adaptive loop filters, from among a plurality of sets of adaptive loop filters, per block of the current picture for blocks in which adaptive loop filtering is used, wherein each respective set of adaptive loop filters includes a previous adaptive loop filter used in one or more previous pictures (700). In one example, to determine the respective sets of adaptive loop filters, video encoder 20 and video decoder 30 are further configured to code a respective flag per block indicating if adaptive loop filtering is used for the respective block, and code, based on the respective flag per block, a respective syntax element indicating the respective set of adaptive loop filters, from among the plurality of sets of adaptive loop filters, per block of the current picture. In one example, the respective syntax element is an index to a list including the plurality of sets of adaptive loop filters. Video encoder 20 and video decoder 30 may be further configured to adaptive loop filter the blocks of the current picture in accordance with the respective sets of adaptive loop filters (702).

Figure 8:
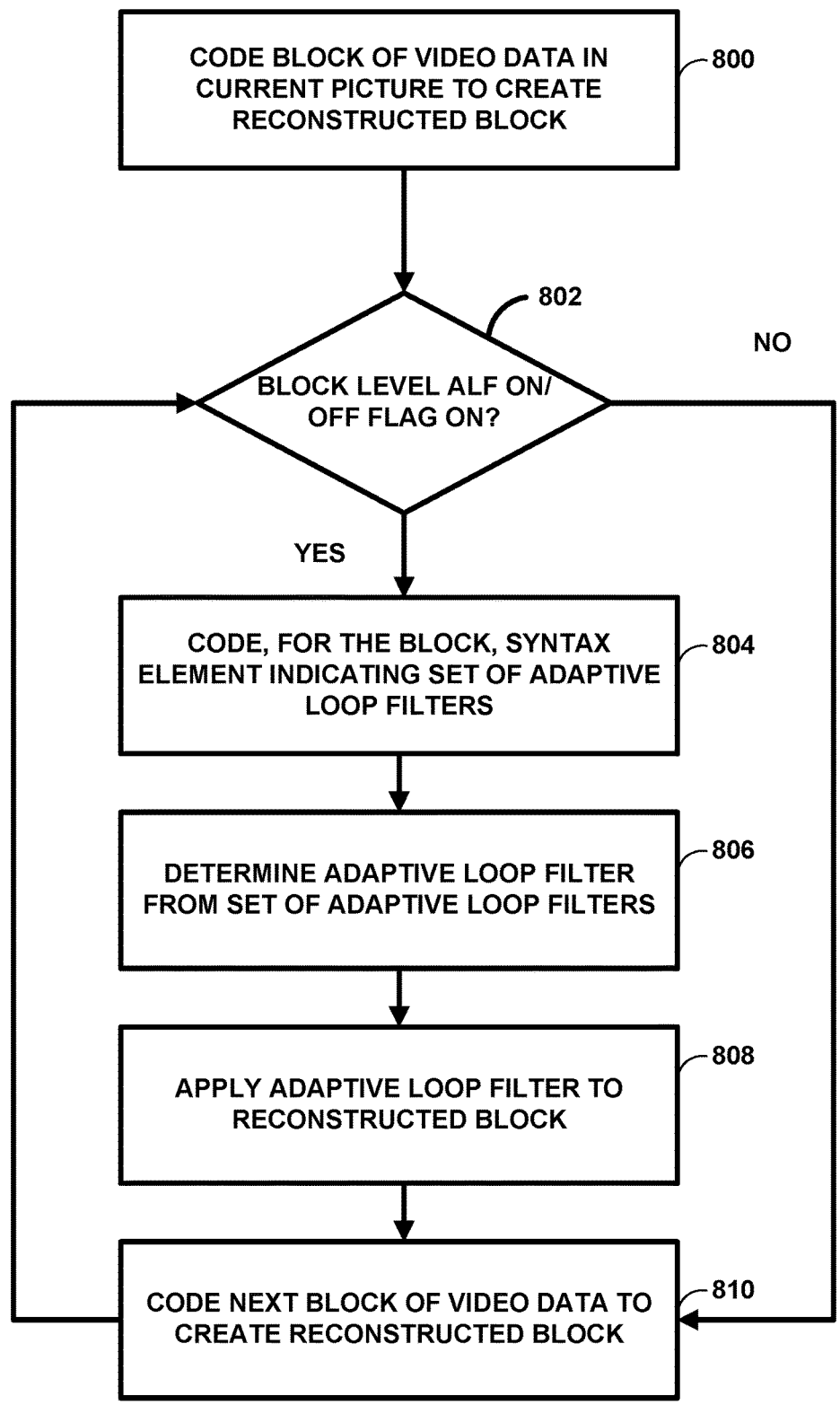
FIG. 8 is a flowchart illustrating another example method of the disclosure.

FIG. 8 is a flowchart illustrating another example method of the disclosure. FIG. 8 shows an example of the techniques of FIG. 7 in more detail. For example, video encoder 20 and video decoder 30 may be configured to code a block of video data in a current picture to create a reconstructed block of video data (800). That is, video encoder 20 and video decoder 30 may be configured to code the first block of video data in the current picture to create a first reconstructed block of video data.

Video encoder 20 and video decoder 30 may then be configured to determine if a block level ALF On/Off flag is on (802). If no, video encoder 20 and video decoder 30 do not apply ALF, and instead proceed to code the next block of video data (810). If yes, video encoder 20 and video decoder 30 code, for the block, a syntax element indicating a set of adaptive loop filters (804). For example, video encoder 20 and video decoder 30 code, for the first block of video data, a first syntax element indicating a first set of adaptive loop filters from among the plurality of sets of adaptive loop filters.

Video encoder 20 and video decoder 30 may then determine an adaptive loop filter from the set of adaptive loop filters for the currently coded block (806). For example, video encoder 20 and video decoder 30 may determine a first adaptive loop filter from the first set of adaptive loop filters for the first reconstructed block of video data. Video encoder 20 and video decoder 30 may then apply the adaptive loop filter to the reconstructed block (808). Video encoder 20 and video decoder 30 may then proceed to code the next block of video data (810). For example, the next block of video data may be a second block of video data. The process of FIG. 8 is then repeated. It should be noted that, when performing the techniques of this disclosure, when determining the set of adaptive loop filters for a next block of video data (e.g., a second block of video data), the set of adaptive loop filters for the second block of video data may be different than the set of adaptive loop filters used for other blocks of video data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to tangible media such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can be any of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining, at a slice level, a plurality of sets of adaptive loop filters applicable to a slice;
   determining, at a block level, a set of adaptive loop filters, from among the plurality of sets of adaptive loop filters, for a block of a current picture, wherein the block of the current picture is a coding tree unit (CTU) of the slice, and wherein the set of adaptive loop filters includes a plurality of adaptive loop filters including one or more previous adaptive loop filters and further including a fixed adaptive loop filter; and
   adaptive loop filtering the block of the current picture in accordance with the set of adaptive loop filters.

2. The method of claim 1, wherein determining the set of adaptive loop filters comprises:
   coding a syntax element indicating the set of adaptive loop filters, from among the plurality of sets of adaptive loop filters, for the block of the current picture.

3. The method of claim 2, wherein the syntax element is an index to a list including the plurality of sets of adaptive loop filters.

4. The method of claim 1, further comprising:
   coding a respective flag per block indicating if adaptive loop filtering is used for the respective block.

5. The method of claim 1, further comprising:
   coding a respective flag per group of blocks of the current picture indicating if adaptive loop filtering is used for each block in the respective group of blocks of the current picture.

6. The method of claim 1, further comprising:
   determining whether adaptive loop filtering is used for each block of the current picture, or for each block in a group of blocks of the current picture based on one or more of:
   a number of blocks in a group of blocks having non-zero coded block flags (CBFs),
   a number of non-zero transform coefficients,
   a number of blocks in a group of blocks coded in a particular mode, and
   a number of blocks in a group of blocks coded with skip mode.

7. The method of claim 1, wherein the set of adaptive loop filters further includes one or more of one or more current adaptive loop filters signaled for the current picture.

8. The method of claim 7, further comprising:
   adding adaptive loop filters to the set of adaptive loop filters so that the one or more current adaptive loop filters signaled for the current picture are added first, the one or more previous adaptive loop filters are added second, and the fixed adaptive loop filter is added last.

9. The method of claim 8, wherein the one or more current adaptive loop filters signaled for the current picture have a lower index value in a filter set list relative to the one or more previous adaptive loop filters.

10. The method of claim 7, further comprising:
    coding, for the current picture, one or more syntax elements indicating a current adaptive loop filter of the one or more current adaptive loop filters for the current picture.

11. The method of claim 1, wherein the set of adaptive loop filters include adaptive loop filters assigned to each class of a plurality of classes.

12. The method of claim 1, wherein determining the set of adaptive loop filters comprises coding, for a first block of video data, a first syntax element indicating a first set of adaptive loop filters from among the plurality of sets of adaptive loop filters, and coding, for a second block of video data, a second syntax element indicating a second set of adaptive loop filters from among the plurality of sets of adaptive loop filters, wherein the second set of adaptive loop filters is different than the first set of adaptive loop filters, the method further comprising:
    coding the first block of video data in the current picture to create a first reconstructed block of video data;
    determining a first adaptive loop filter from the first set of adaptive loop filters for the first reconstructed block of video data;
    applying the first adaptive loop filter to the first reconstructed block of video data;
    coding the second block of video data in the current picture to create a second reconstructed block of video data;
    determining a second adaptive loop filter from the second set of adaptive loop filters for the second reconstructed block of video data; and
    applying the second adaptive loop filter to the second reconstructed block of video data.

13. The method of claim 1, wherein coding comprises encoding, the method further comprising:
    capturing the current picture with a camera.

14. The method of claim 1, wherein coding comprises decoding, the method further comprising:
    displaying the current picture.

15. The method of claim 1, wherein the block of the current picture is a first block of the current picture, the method further comprising:
    adaptive loop filtering a second block of the current picture in accordance with the set of adaptive loop filters determined for the first block of the current picture.

16. An apparatus configured to code video data, the apparatus comprising:

a memory configured to store a current picture of video data; and one or more processors in communication with the memory, the one or more processors configured to:

determine, at a slice level, a plurality of sets of adaptive loop filters applicable to a slice;

determine, at a block level, a set of adaptive loop filters, from among the plurality of sets of adaptive loop filters, for a block of the current picture, wherein the block of the current picture is a coding tree unit (CTU) of the slice, and wherein the set of adaptive loop filters includes a plurality of adaptive loop filters including one or more previous adaptive loop filters and further including a fixed adaptive loop filter; and adaptive loop filter the block of the current picture in accordance with the set of adaptive loop filters.

17. The apparatus of claim 16, wherein to determine the set of adaptive loop filters, the one or more processors are further configured to:

code a syntax element indicating the set of adaptive loop filters, from among the plurality of sets of adaptive loop filters, for the block of the current picture.

18. The apparatus of claim 17, wherein the syntax element is an index to a list including the plurality of sets of adaptive loop filters.

19. The apparatus of claim 16, wherein the one or more processors are further configured to:

code a respective flag per block indicating if adaptive loop filtering is used for the respective block.

20. The apparatus of claim 16, wherein the one or more processors are further configured to:

code a respective flag per group of blocks of the current picture indicating if adaptive loop filtering is used for each block in the respective group of blocks of the current picture.

21. The apparatus of claim 16, wherein the one or more processors are further configured to:

determine whether adaptive loop filtering is used for each block of the current picture, or for each block in a group of blocks of the current picture based on one or more of:

a number of blocks in a group of blocks having non-zero coded block flags (CBFs), a number of non-zero transform coefficients, a number of blocks in a group of blocks coded in a particular mode, and a number of blocks in a group of blocks coded with skip mode.

22. The apparatus of claim 16, wherein the set of adaptive loop filters further includes one or more of one or more current adaptive loop filters signaled for the current picture.

23. The apparatus of claim 22, wherein the one or more processors are further configured to:

add adaptive loop filters to the set of adaptive loop filters so that the one or more current adaptive loop filters signaled for the current picture are added first, the one or more previous adaptive loop filters are added second, and the fixed adaptive loop filter is added last.

24. The apparatus of claim 23, wherein the one or more current adaptive loop filters signaled for the current picture have a lower index value in a filter set list relative to the one or more previous adaptive loop filters.

25. The apparatus of claim 22, wherein the one or more processors are further configured to:

code, for the current picture, one or more syntax elements indicating a current adaptive loop filter of the one or more current adaptive loop filters for the current picture.

26. The apparatus of claim 16, wherein the set of adaptive loop filters include adaptive loop filters assigned to each class of a plurality of classes.

27. The apparatus of claim 16, wherein to determine the set of adaptive loop filters, the one or more processors are further configured to code, for a first block of video data, a first syntax element indicating a first set of adaptive loop filters from among the plurality of sets of adaptive loop filters, and code, for a second block of video data, a second syntax element indicating a second set of adaptive loop filters from among the plurality of sets of adaptive loop filters, wherein the second set of adaptive loop filters is different than the first set of adaptive loop filters, and wherein the one or more processors are further configured to:

code the first block of video data in the current picture to create a first reconstructed block of video data;

determine a first adaptive loop filter from the first set of adaptive loop filters for the first reconstructed block of video data;

apply the first adaptive loop filter to the first reconstructed block of video data;

code the second block of video data in the current picture to create a second reconstructed block of video data;

determine a second adaptive loop filter from the second set of adaptive loop filters for the second reconstructed block of video data; and apply the second adaptive loop filter to the second reconstructed block of video data.

28. The apparatus of claim 16, wherein to code the one or more processors are configured to encode, the apparatus further comprising:

a camera configured to capture the current picture.

29. The apparatus of claim 16, wherein to code the one or more processors are configured to decode, the apparatus further comprising:

a display configured to display the current picture.

30. The apparatus of claim 16, wherein the block of the current picture is a first block of the current picture, and wherein the one or more processors are further configured to:

adaptive loop filter a second block of the current picture in accordance with the set of adaptive loop filters determined for the first block of the current picture.

31. An apparatus configured to code video data, the apparatus comprising:

means for determining, at a slice level, a plurality of sets of adaptive loop filters applicable to a slice;

means for determining, at a block level, a set of adaptive loop filters, from among the plurality of sets of adaptive loop filters, for a block of a current picture, wherein the block of the current picture is a coding tree unit (CTU) of the slice, and wherein the set of adaptive loop filters includes a plurality of adaptive loop filters including one or more previous adaptive loop filters and further including a fixed adaptive loop filter; and means for adaptive loop filtering the block of the current picture in accordance with the set of adaptive loop filters.

32. The apparatus of claim 31, wherein the means for determining the set of adaptive loop filters comprises:

means for coding a flag for the block indicating if adaptive loop filtering is used for the block; and means for coding, based on the flag for the block, a syntax element indicating the set of adaptive loop filters, from among the plurality of sets of adaptive loop filters, for the block of the current picture.

33. The apparatus of claim 31, wherein the set of adaptive loop filters further includes one or more of one or more current adaptive loop filters signaled for the current picture.

34. A non-transitory computer-readable storage medium storing instructions that, when executed, cause one or more processors to:
- determine, at a slice level, a plurality of sets of adaptive loop filters applicable to a slice;
- determine, at a block level, a set of adaptive loop filters, from among the plurality of sets of adaptive loop filters, for a block of a current picture, wherein the block of the current picture is a coding tree unit (CTU) of the slice, and wherein the set of adaptive loop filters includes a plurality of adaptive loop filters including one or more previous adaptive loop filters and further including a fixed adaptive loop filter; and
- adaptive loop filter the block of the current picture in accordance with the set of adaptive loop filters.

35. The non-transitory computer-readable storage medium of claim 34, wherein to determine the respective sets of adaptive loop filters, the instructions further cause the one or more processors to:
- code a flag for the block indicating if adaptive loop filtering is used for the block; and
- code, based on the flag for the block, a syntax element indicating the set of adaptive loop filters, from among the plurality of sets of adaptive loop filters, for the block of the current picture.

36. The non-transitory computer-readable storage medium of claim 34, wherein the set of adaptive loop filters further includes one or more of one or more current adaptive loop filters signaled for the current picture.

* * * * *